United States Patent [19]

Simshauser

[11] 4,258,233
[45] Mar. 24, 1981

[54] TRACK SKIPPER APPARATUS FOR VIDEO DISC PLAYER

[75] Inventor: Elvin D. Simshauser, Columbus, N.J.

[73] Assignee: RCA Corporation, New York, N.Y.

[21] Appl. No.: 39,358

[22] Filed: May 15, 1979

[30] Foreign Application Priority Data

Nov. 16, 1978 [GB] United Kingdom ............... 44734/78

[51] Int. Cl.³ .............................................. G11B 21/00
[52] U.S. Cl. ........................................ 369/33; 360/10;
 360/78; 369/43; 369/213
[58] Field of Search .................. 358/128, 128.5, 128.6;
 179/100.3 V, 100.1 G, 100.4 D, 100.41 M,
 100.41 K; 360/10, 11, 75, 77, 78, 107, 108, 109

[56] References Cited

U.S. PATENT DOCUMENTS

| | | | |
|---|---|---|---|
| 3,963,860 | 6/1976 | Burrus | 358/128 |
| 3,963,861 | 6/1976 | Crooks | 358/128 |
| 3,973,080 | 8/1976 | Dickopp et al. | 358/128 |
| 3,993,863 | 11/1976 | Leedom et al. | 358/128 |
| 4,152,727 | 5/1979 | Tatsuguchi et al. | 358/128 |
| 4,160,268 | 7/1979 | Goto et al. | 358/128 |
| 4,164,756 | 8/1979 | Toda et al. | 358/128 |
| 4,170,783 | 10/1979 | Tajima | 358/128 |
| 4,183,059 | 1/1980 | Palmer | 358/128 |

Primary Examiner—Stuart N. Hecker
Assistant Examiner—Donald McElheny, Jr.
Attorney, Agent, or Firm—E. M. Whitacre; J. S. Tripoli; D. A. Kulkarni

[57] ABSTRACT

In a video disc player, a carriage is subject to translatory motion in correlation with radial motion of a playback stylus relative to a disc record. A stylus arm carrying the stylus at one end thereof has the other end pivotally secured to the carriage. A permanent magnet is mounted on the stylus arm near its free end. A pair of spaced coils having non-magnetic cores are disposed on the carriage such that the stylus arm-mounted magnet is interposed therebetween. The coils are selectively energized to change the radial location of the stylus relative to the record.

4 Claims, 8 Drawing Figures

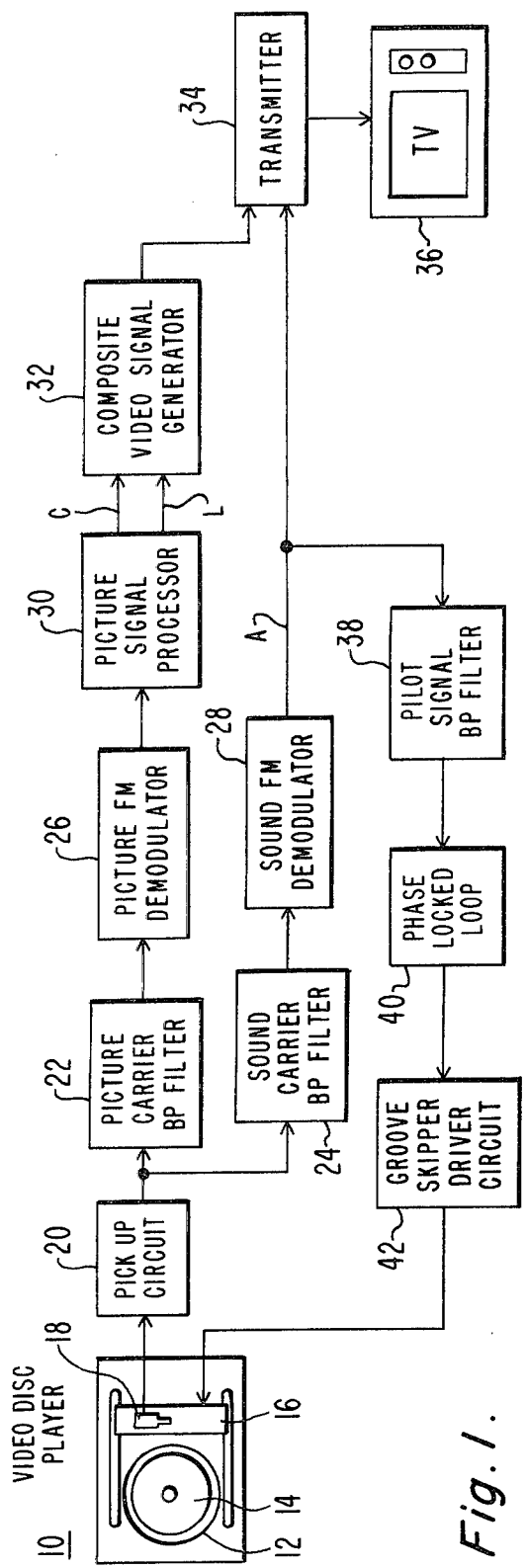
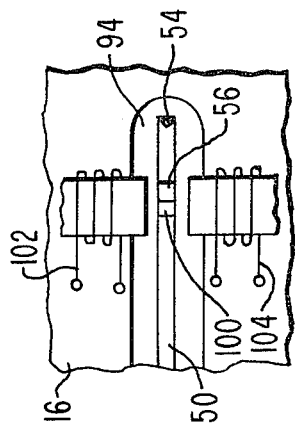
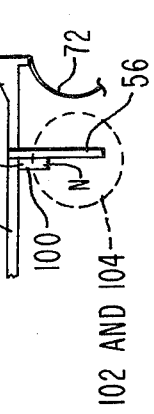
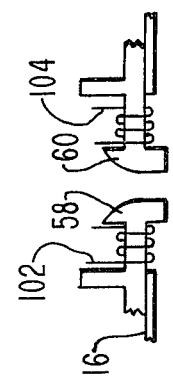

TRACK SKIPPER APPARATUS FOR VIDEO DISC PLAYER

This invention pertains to an apparatus utilized in the playback of a video disc record, and more particularly, to an apparatus for selectively repositioning a player stylus from one convolution to another of a signal-encoded spiral track disposed on the record surface.

In U.S. Pat. No. 3,842,194, issued on Oct. 15, 1974 to Jon K. Clemens, in general video disc playback systems of a variable capacitance form are disclosed. In an illustrative arrangement therein disclosed, an information track incorporates geometric variations in the bottom of a spiral groove in a disc, the surface of which comprises conductive material covered with a thin coating of dielectric material. Variations in the capacitance presented between a conductive electrode on a tracking stylus and the conductive material of the disc occur as the disc is rotated by a supporting turntable. The capacitance variations are sensed to recover the recorded information. Capacitive video disc systems may also advantageously employ conductive (or semiconductive) discs as compared to the coated discs.

In certain applications of a video disc system of the Clemens type, it may be desirable to provide repeat play of the displayed image. That is, to repetitively provide output signals of basically the same displayed image on an associated television monitor. Such image repeat play may be desirable for allowing a viewer to observe a particular image for relatively long lengths of time.

A further desirable feature for incorporation with a video disc player is the ability to provide rapid forward motion or reverse motion of the displayed image. A rapid forward function is particularly useful for quickly scanning information recorded on the video disc. A reverse motion function may also be utilized for aiding in data retrieval, and is particularly useful as a teaching aid for reviewing an instructional picture sequence recorded on the disc.

Moreover, in the playback of the disc records of the above-mentioned type, conditions are occasionally encountered when the presence of some form of defect in the disc groove, or information track, causes the player stylus to skip across grooves rather than follow the successive convolutions of the spiral groove in a regular progression toward one extremity thereof. For example, as the defect is encountered, the stylus may be deflected toward the outer disc convolutions thereby causing repeat traversal of one or more previously traversed convolutions. In some instances, the outward deflection of the stylus is repeated for a substantial number of successive encounters with the defect. This condition is herein referred to as a "locked groove" condition, producing undesired repetitive replay of the same recorded information, with annoying effects on picture display and accompanying sound reproductions.

To provide special effect features (e.g., repeat play, fast forward, reverse, trick plays, etc.) and to correct locked groove conditions, it is desirable to provide a selectively actuated apparatus for repositioning the pickup stylus from one convolution to another of the record spiral track.

U.S. Pat. No. 3,963,961, issued on June 15, 1976, to H. N. Crooks, and U.S. Pat. No. 3,993,863, issued on Nov. 23, 1976 to Leedom, et al., described illustrative groove skipping systems. In these systems, selectively actuated piezoelectric bimorph elements cause lateral shifting of the stylus-carrying end of the stylus arm.

According to the invention described in U.S. patent applications, Ser. No. 908,515 (Palmer), and now U.S. Pat. No. 4,183,059 and entitled "Track Skipper for Video Disc Player," selective radial repositioning of the playback stylus is achieved by twisting the stylus arm about its longitudinal axis, and the offset of the stylus tip from the rotational axis results in consequent radial motion of the stylus tip across track convolutions of the disc record. In accordance with a further feature of the Palmer invention, the stylus-carrying end of the stylus arm is substantially immobilized in the lateral direction while the stylus arm is rotated to assure that the twisting of the stylus arm results in rotation of the stylus about the axis of the stylus arm, rather than rotation of the stylus arm about the stylus tip.

An advantageous configuration for selectively changing the convolution which is tracked by the stylus is herein described. In accordance with the apparatus pursuant to this invention, a playback stylus is mounted on the stylus arm near its free end. The other end of the stylus arm is pivotally secured to a carriage, which is radially translated during playback in synchronism with the motion of the stylus toward the center of disc record. A permanent magnet is mounted on the stylus arm near its free end. A pair of spaced coils having non-magnetic cores are mounted on the carriage such that the permanent magnet is disposed therebetween. A circuit is provided for selectively energizing the coils to cause a shift in the radial location of the stylus.

IN THE DRAWINGS:

FIG. 1 is a block diagram representation of a video disc player incorporating the track skipper apparatus of this invention;

FIG. 6 shows a pair of bumpers mounted in the carriage for limiting side-to-side motion of the stylus; and FIGS. 7 and 8 diagrammatically illustrate the relative disposition of certain elements of the track skipper apparatus of FIG. 1.

Figure 2:
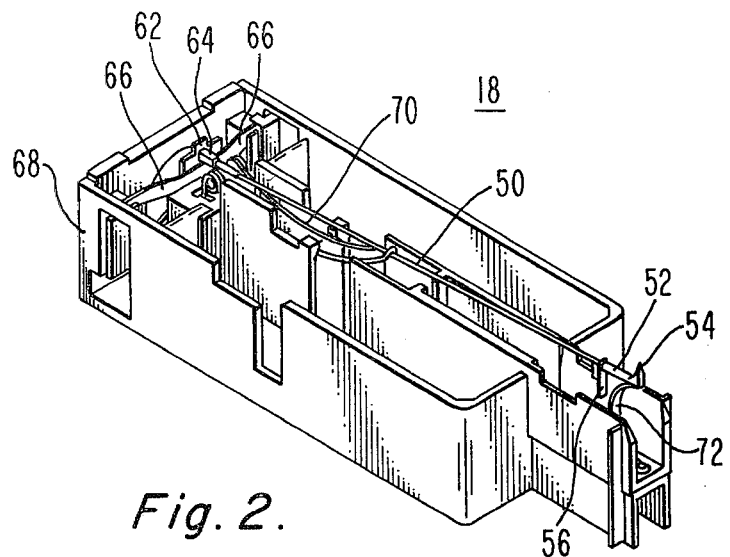
FIG. 2 illustrates a pickup cartridge suitable for use in the video disc player of FIG. 1.
Figure 3:
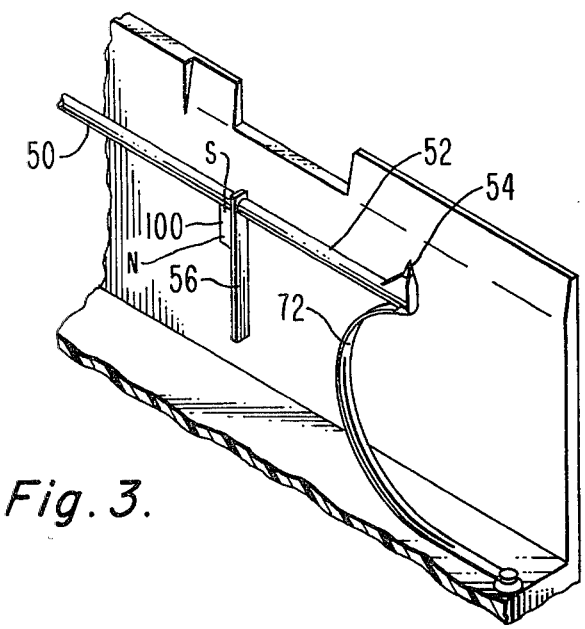
FIG. 3 shows an enlarged view of a portion of the pickup cartridge of FIG. 2.

Referring now to FIG. 1, a video disc playback system incorporating a locked groove detection and correction system is shown. The circuit shown in FIG. 1 for detecting the occurrence of a locked groove condition is of the type described in detail in U.S. patent application, Ser. No. 908,516, now U.S. Pat. No. 4,198,658, filed on behalf of R. C. Palmer and entitled "Recording/Playback Apparatus Facilitating Track Skip Detection." A track skipper apparatus pursuant to this invention, and suitable for use with a locked groove detection circuit, such as that disclosed in the Palmer application, is hereinbelow described. The locked groove detection circuit will be described first in conjunction with FIG. 1.

As shown in FIG. 1, a video disc player 10 has a turntable 12 for rotatably supporting a video disc 14 having a spiral information track containing picture signal information inclusive of synchronizing components and a pilot signal. The frequencies of the synchronizing components and the pilot signal are such that an integral number of synchronizing components and a non-integral number of pilot signal cycles occupy each convolution of the spiral track. The player 10 further includes a carriage 16 subject to translation in synchronism with the radial motion of the player stylus during playback. The carriage 16 has a compartment for removably receiving a pickup cartridge 18 which houses the signal pickup assembly.

A pickup circuit 20, responsive to the output of the signal pickup, develops at its output terminal a pulse train representative of the recorded information. The pickup circuit 20 is illustratively of the type described in the U.S. Pat. No. 4,080,625, issued on Mar. 21, 1978 to Kawamoto, et al. The output of the pickup circuit 20 is delivered to a pair of bandpass filters 22 and 24. The picture carrier bandpass filter 22 has a relatively wide passband encompassing the deviation range of the high frequency picture carrier (e.g., 4.3 to 6.3 MHz) as well as the requisite adjacent sideband regions, and selectively passes the picture carrier component of the recorded signal to the relative exclusion of the sound carrier component thereof.

The sound carrier bandpass filter 24 has a relatively narrow passband encompassing the deviation range of the low frequency sound carrier (e.g., 716 KHz±55 KHz) as well as the requisite adjacent sideband regions, and selectively passes the sound carrier component of the recorded signal to the relative exclusion of the picture carrier component thereof.

The outputs of the respective bandpass filters 22 and 24 are passed to respective demodulators 26 and 28. The picture demodulator 26 develops at its output terminal the recorded picture signal information inclusive of synchronizing components, and the sound demodulator 28 develops at its output the recorded audio signal information and the pilot signal.

A picture signal processor 30, coupled to the picture demodulator, effects the separation of the chrominance information from the liminance information. A composite video signal generator 32 recombines the chrominance and the luminance information in accordance with, for example, the NTSC format. A transmitter 34 processes the sound, luminance and the chrominance information to form a signal suitagle for delivery to a color TV receiver 36, wherein color image displays may be developed in accordance with the recorded information. Illustratively, where signal delivery to the antenna terminals of a color TV receiver is desired, the circuits include means for combining the separated components to form a new composite signal, which composite signal modulates a suitable RF carrier. U.S. Pat. No. 4,097,899, issued to J. P. Yu, describes an illustrative transmitter apparatus.

A pilot signal bandpass filter 38 having a relatively narrow bandpass (e.g., 21.18 KHz±1.5 KHz) passes the recovered pilot signal to the exclusion of other recorded information. A phase locked loop 40, responsive to the deviations in the phase of the recovered pilot signal due to a disruption in the regular progression of the player stylus along the spiral track by a sudden radial shift in the location of the stylus, developes an error signal having an amplitude and a polarity indicative of the magnitude and sense of the disruption in the regular progression. A groove skipper driver circuit 42 responsive to the development of an error signal of a given sense and an amplitude exceeding a given threshold develops a standard correction pulse. A suitable groove skipper mechanism responsive to the correction pulse effects a radial shift in the location of the player stylus in a manner that offsets the disruption in the regular progression of the player stylus. One type of groove skipper mechanism is described in detail in U.S. patent application, Ser. No. 908,515, filed in the name of R. C. Palmer and entitled "TRACK SKIPPER FOR A VIDEO DISC PLAYER".

A track skipper apparatus in accordance with the instant invention will now be described in detail with reference to FIGS. 2–8. Shown in FIG. 2 is the pickup cartridge 18. The cartridge comprises a stylus arm 50 which carries at the free end thereof a stylus holder 52. A pickup stylus 54 is secured to the stylus holder 52. An extension 56, disposed on the stylus holder 52, is interposed between a pair of non-magnetic, plastic bumpers 58 and 60 (FIGS. 4–6) mounted on the carriage 16. The bumpers 58 and 60 serve to limit side-to-side excursion of the stylus 54.

The other end of the stylus arm 50 is secured to a connector plate 62 via a compliant coupler 64. A flexible diaphragm 66 secures the connector plate 62 to the cartridge body 68. A U-shaped spring 70 serves to retain the stylus assembly within the confines of the cartridge during storage and handling. A conductive leaf spring 72 connects an electrode (not shown) incorporated in the stylus 54 to a terminal (not shown) disposed on the cartridge 18.

Figure 4:
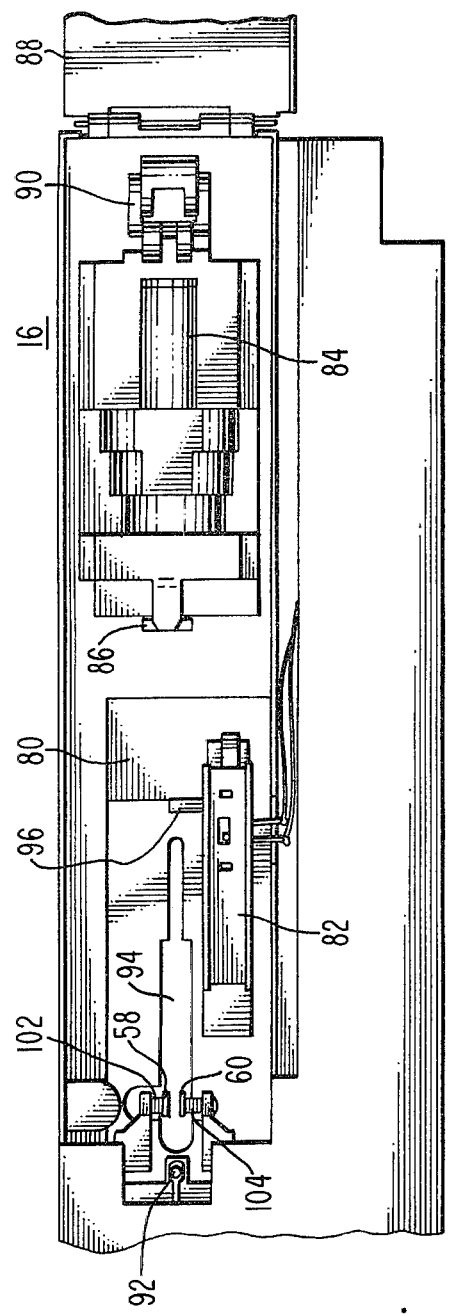
FIG. 4 depicts a carriage having a compartment for receiving the pickup cartridge of FIGS. 2 and 3.

The cartridge 18 is removably received in a compartment 80 provided in the carriage 16 (FIG. 4). As previously indicated, the carriage 16 is subject to translation toward the record center in correlation with the radial motion of the stylus during playback.

Mounted in the carriage 16 are a stylus arm lifting/lowering mechanism 82 and an armstretcher apparatus 84. The stylus arm lifting/lowering mechanism may be of the type described in U.S. Pat. No. 4,053,161 issued to J. C. Bleazey, et al. on Oct. 11, 1977. The lifting/lowering mechanism 82 serves to gently lower the pickup stylus 54 on the video disc for playback. The mechanism 82 also serves to lift the stylus away from the record, for example, for allowing the stylus to clear the peripheral bead of the record as the carriage 16 is translated from the off-record, rest position to the on-record, play position, or for example, when the player is in the pause mode.

The armstretcher apparatus 84 is provided with a support 86. When the carriage 18 is installed in the compartment 80 and the lid 88 of the carriage is closed, a mechanism 90, responsive to the lid movement, effects engagement between the connector plate 62 of the cartridge 18 and the support 86 of the armstretcher 84. The mechanism 90 also serves to effect engagement between the cartridge terminal and another terminal 92 disposed of the carriage for electrically connecting the stylus electrode to the rest of the player circuitry. The support 86 of the armstretcher apparatus imparts translatory motion to the stylus arm in a manner that apposes cyclical deviations in the stylus/record relative velocity during playback. The cyclical deviations in the stylus/record relative velocity result from a number of sources, for example, eccentricity, warp, etc. U.S. Pat. No. 3,983,318 (Miller) describes an illustrative armstretcher apparatus.

The bottom wall of the carriage has an opening 94 for permitting the playback stylus to protrude therethrough during playback to effect stylus/record engagement when the stylus arm is lowered by the stylus arm lifting/lowering mechanism 82.

A lever (not shown) disposed on the lid 88 serves to defeat the U-shaped, stylus arm retaining spring allowing the stylus arm to rest on an arm 96 of the lifing/lowering mechanism 82 when the lid is closed after installing the cartridge in the carriage compartment.

Figure 5:
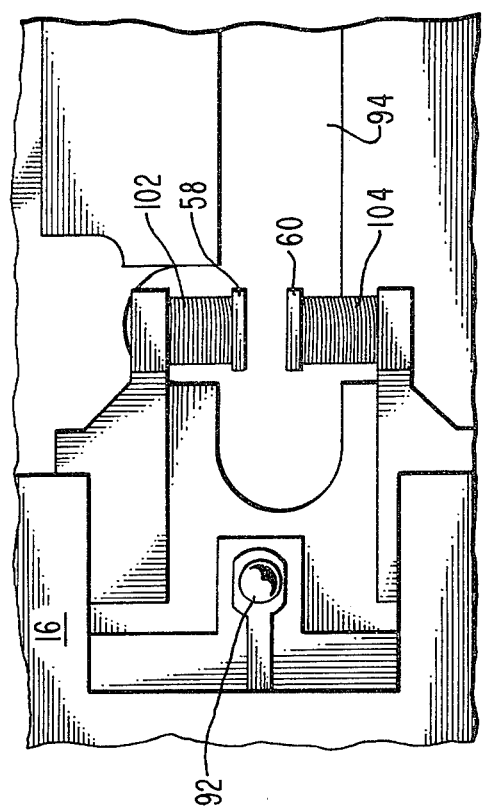
FIG. 5 is an enlarged view of a portion of the carriage of FIG. 4.

Secured to the back side of the extension 56 is a small, light-weight permanent magnet 100 (e.g., made from material such as samarium cobalt. The magnet 100 is secured to the extension 56 such that the north-south axis is in the vertical direction with the north pole above the south pole. Illustratively, the dimensions of the permanent magnet are 0.015×0.015×0.100 inches. A pair of large diameter, air-core coils 102 and 104 are disposed about the non-magnetic, plastic bumpers 58 and 60 as illustrated in FIGS. 4, 5 and 7. An error signal, indicative of a groove skip, is applied to the coils in such manner that they generate aiding magnetic fields (i.e., when one inner face is magnetically north, the other face has a magnetically south polarity). Illustratively, each coil comprises 126 turns (e.g., 7 layers with 18 turns per layer) of #38 gauge wire. Other illustrative coil parameters are: coil diameter: 0.125 inches; coil resistance: 5.7 ohms; drive current: 0.44 amperes; and pulse duration: 0.5 milliseconds. Generally, it is desirable that the coils 102 and 104 are disposed in a Helmholtz configuration (that is, the coil diameter is equal to twice the coil separation). This configuration gives nearly uniform field strength in the region between the ends of the two coils. This arrangement minimizes variations in skip sensitivity when record surface waviness and eccentricity cause the stylus to move around laterally and vertically between the coils. However, the actual coil construction may deviate from an exact Helmholtz configuration without substantially affecting the performance of the skipper (for example, a coil separation of 0.235 inches may be used).

If desired, the coils 102 and 104 may be interconnected in a way such that the application of a single error signal will set up aiding magnetic fields as described above. That is, when coils 102 and 104 are interconnected they form a two terminal device to receive an error signal which causes one inner face to be magnetically north and the opposing inner face to be magnetically south.

As can be seen from FIG. 8, only one pole of the magnet 100 (e.g., the north pole) is directly located between the driving coils 102 and 104 when the stylus arm 50 is disposed in the lowered position. Thus, although the two poles of the magnet 100 may experience opposing forces when a current pulse is applied to the coils, the upper end receives a much larger force, and thus a net force difference is generated which then moves the stylus 54. Because the distances moved are quite small (e.g., 0.001 inch), a 0.5 millisecond electrical pulse is adequate to displace the stylus 54, and movement to overcome a locked groove condition can, therefore, be accomplished with minimal picture disturbance.

When an error signal is applied to the coils 102 and 104, a magnetic field is set up in the vicinity of the upper pole of magnet 100 and the magnetic forces thus generated cause a twisting motion of stylus arm 50 as well as lateral motion. It is believed with this complex form of motion occurs because the upper pole of magnet 100 is well above the plane in which the arm 50 lies during playback. That is, the offset position of magnet 100 on extension 56 generates the twisting motion about the longitudinal axis of the arm 50.

It will be noted that while the description herein is in the context of grooved discs, it is equally applicable to flat discs. Various defects on flat discs can cause the player stylus to retrace the same track again and again. The system described herein can be advantageously employed to clear such a condition in the playback of a flat disc in accordance with the principles of the present invention.

A concurrently-filed, commonly-assigned related U.S. patent application, Ser. No. 39,359, filed in the name of Bleazey and entitled "TRACK SKIPPER FOR VIDEO DISC PLAYER", describes a selectively-energized electro-magnetic apparatus for effecting radial shift in the position of the playback stylus.

What is claimed is:

1. In a system for recovering prerecorded information from a disc record having a spiral information track by a track-following stylus when stylus/record relative velocity is established; wherein normal operation of said system involves sensing of said prerecorded information along successive convolutions of said spiral track in a regular progression toward one extremity; an apparatus comprising:
   (A) a carriage subject to translatory motion in correlation with radial motion of said track-following stylus during playback; said carriage having an opening in a bottom wall thereof;
   (B) a stylus arm carrying said track-following stylus at one end thereof;
   (C) means for yieldably securing the other end of said stylus arm to said carriage; said yieldable securing means permitting said track-following stylus to protrude through said opening when said stylus arm is lowered during playback;
   (D) a permanent magnet secured to said stylus arm near said one end thereof;
   (E) a pair of spaced coils having non-magnetic cores for providing a substantially uniform magnetic field therebetween upon energization;
   (F) means for mounting said pair of coils to said carriage such that said permanent magnet is disposed therebetween; and
   (G) means for selectively energizing said coils to cause a shift in the radial location of said track-following stylus.

2. The apparatus as defined in claim 1 wherein said spaced coils are coaxially mounted in said carriage; the direction of currents passing through said coils being such that said coils generate aiding magnetic fields when energized; said securing of said permanent magnet to said stylus arm being such that only one pole of said magnet extends between said coils when said stylus arm is lowered.

3. The apparatus as defined in claim 2 wherein an extension is disposed on said stylus arm in the vicinity of said one end; said extension being dimensioned such that an end thereof projects into said carriage when said stylus arm is lowered; said extension providing support for said permanent magnet.

4. The apparatus as defined in claim 3 wherein a pair of spaced bumpers is mounted to said carriage such that said extension is disposed therebetween; said bumpers providing supports for said spaced coils.

* * * * *